(12) United States Patent
Huffman

(10) Patent No.: US 11,979,048 B2
(45) Date of Patent: May 7, 2024

(54) INDUCTIVE CHARGING DEVICE HOLDER

(71) Applicant: B/E Aerospace, Inc., Winston-Salem, NC (US)

(72) Inventor: Ethan C Huffman, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 289 days.

(21) Appl. No.: 17/477,283

(22) Filed: Sep. 16, 2021

(65) Prior Publication Data

US 2022/0094183 A1    Mar. 24, 2022

Related U.S. Application Data

(60) Provisional application No. 63/080,334, filed on Sep. 18, 2020.

(51) Int. Cl.
*B60R 11/02*    (2006.01)
*B60N 2/90*    (2018.01)
(Continued)

(52) U.S. Cl.
CPC .............. *H02J 7/0044* (2013.01); *B60N 2/90* (2018.02); *B60R 11/02* (2013.01); *H02J 50/10* (2016.02);
(Continued)

(58) Field of Classification Search
CPC .......... H02J 7/0044; H02J 50/10; H02J 50/20; H02J 50/90; B60N 2/90; B60R 11/02; B60R 2011/0012; B60R 11/0241; B60R 2011/0015; B60R 2011/0071; B64D 11/00152

See application file for complete search history.

(56) References Cited

U.S. PATENT DOCUMENTS 8,203,657 B2   6/2012  Vitito
9,457,725 B2   10/2016 McClain et al.
(Continued)

FOREIGN PATENT DOCUMENTS

CN   108521488 A    9/2018
CN   108909742 A    11/2018
(Continued)

OTHER PUBLICATIONS

Extended Search Report in European Application No. 21197749.1 dated Jan. 31, 2022, 7 pages.

*Primary Examiner* — Bradley Duckworth
(74) *Attorney, Agent, or Firm* — Suiter Swantz IP

(57) ABSTRACT

A system is disclosed. The system includes a restraint apparatus for securing a mobile electronic device to a passenger seat. The restraint apparatus includes a backing plate to support a back surface of the mobile electronic device. The restraint apparatus further includes a support assembly that includes support tabs to support the bottom end of the mobile electronic device and a support bias mechanism to bias the tabs in at least one of an extended or retracted position. The restrain apparatus further includes a claw assembly that includes claws to support the top end of the mobile electronic device and a claw bias mechanism to bias the claws in at least one or a default or protracted position. The system may further include wireless charging capability.

11 Claims, 11 Drawing Sheets

(51) Int. Cl.
  *H02J 7/00* (2006.01)
  *H02J 50/10* (2016.01)
  *H02J 50/20* (2016.01)
  *B60R 11/00* (2006.01)
  *H02J 50/90* (2016.01)

(52) U.S. Cl.
  CPC ....... *H02J 50/20* (2016.02); *B60R 2011/0012* (2013.01); *H02J 50/90* (2016.02)

(56) References Cited

U.S. PATENT DOCUMENTS

| | | | |
|---|---|---|---|
| 9,457,905 | B2 | 10/2016 | Felske et al. |
| 9,511,862 | B2 | 12/2016 | Thiele et al. |
| 9,712,741 | B2 | 7/2017 | Kothari |
| 9,758,248 | B2 | 9/2017 | Procter et al. |
| 9,776,722 | B2 * | 10/2017 | Pozzi ............... B64D 11/00152 |
| 9,809,311 | B2 | 11/2017 | Young et al. |
| 9,960,800 | B2 | 5/2018 | An et al. |
| 10,029,793 | B2 | 7/2018 | Pozzi et al. |
| 10,111,000 | B1 | 10/2018 | Ho et al. |
| 10,220,796 | B2 | 3/2019 | Neumann et al. |
| 10,261,543 | B2 | 4/2019 | Schachter et al. |
| 10,301,028 | B2 | 5/2019 | Stephens et al. |
| 10,326,299 | B2 | 6/2019 | Jouper et al. |
| 10,513,210 | B2 | 12/2019 | Gomez et al. |
| 10,562,635 | B2 | 2/2020 | Colletti |
| 10,689,116 | B1 | 6/2020 | Ahad et al. |
| 10,703,482 | B1 | 7/2020 | Puglisi et al. |
| 2012/0120626 | A1* | 5/2012 | Akaike ................... B60R 11/02 361/807 |
| 2015/0123433 | A1 | 5/2015 | Lamb, Jr. et al. |
| 2016/0280375 | A1 | 9/2016 | Heredia et al. |
| 2016/0355263 | A1* | 12/2016 | Pozzi ............... B64D 11/00152 |
| 2017/0212555 | A1 | 7/2017 | Fafard |
| 2018/0118343 | A1 | 5/2018 | Castaing et al. |
| 2018/0118344 | A1 | 5/2018 | Galipeau et al. |
| 2019/0007541 | A1 | 1/2019 | Robillard et al. |
| 2019/0126800 | A1 | 5/2019 | Pajic |
| 2020/0139898 | A1 | 5/2020 | Barnes et al. |

FOREIGN PATENT DOCUMENTS

| | | |
|---|---|---|
| CN | 109279027 A | 1/2019 |
| CN | 108556860 B | 9/2019 |
| DE | 102018005668 A1 | 1/2019 |
| EP | 2810808 A1 | 12/2014 |
| EP | 3633962 A1 | 4/2020 |
| EP | 3274258 B1 | 5/2020 |
| KR | 1020200059894 A | 5/2020 |
| WO | 2015010123 A1 | 1/2015 |
| WO | 2016062392 A1 | 4/2016 |
| WO | 2016092509 A1 | 6/2016 |
| WO | 2016167720 A1 | 10/2016 |

* cited by examiner

INDUCTIVE CHARGING DEVICE HOLDER

PRIORITY

The present application claims the benefit under 35 U.S.C. § 119(e) of U.S. Provisional App. No. 63/080,334 entitled "Inductive Charging Device Holder" filed on Sep. 18, 2020, which is incorporated herein by reference in its entirety.

BACKGROUND

With the mobile phone and tablet market growing, many airlines are moving from inflight entertainment (IFE) systems to personal electronic device (PED) systems. This change necessitates a change in passenger seating, charging devices, and other related equipment. These changes may be costly and time-extensive. Designing PED systems that fit the wide variety of shapes, sizes, and charging technologies of PED devices may be difficult. Thus, it is desirable to provide a system or method that avoids the shortcomings of conventional approaches.

SUMMARY

A system is disclosed. In one or more embodiments, the system includes a restraint apparatus for securing a mobile electronic device to a passenger seat. The restraint apparatus includes a backing plate configured to attach to the passenger seat and provide support to a back surface of the mobile electronic device. The restraint apparatus further includes a support assembly coupled to the backing plate configured to support a bottom end of the mobile electronic device. The support assembly includes one or more support tabs configured to rotate along a horizontal axis relative to a surface of the backing plate and through a first aperture within the backing plate into an extended position, wherein the one or more support tabs configured in the extended position are configured to support the bottom end of the mobile electronic device. The support assembly further includes a support bias mechanism that biases one of the one or more support tabs into at least one of the extended position or a retracted position. The restraint apparatus further includes a claw assembly coupled to the backing plate configured to support a top end of the mobile electronic device. The claw assembly includes one or more claws configured to articulate vertically through a second aperture within the backing plate from a default position to a protracted position, wherein the one or more claws configured in the protracted position supports the top end of the mobile electronic device. The claw assembly further includes a claw bias mechanism that biases the one or more claws towards the default position.

In some embodiments of the system, at least one of the one or more claws is configured to bias the mobile electronic device towards at least one of the backing plate or at least one of the one or more support tabs configured in the extended position.

In some embodiments of the system, at least one or the one or more support tabs is configured to bias the mobile electronic device towards at least one of the backing plate or at least one of the one or more claws configured in the default position.

In some embodiments of the system, the one or more claws are further configured to rotate along the horizontal axis relative to the surface of the backing plate, wherein a rotation of the one or more claws along the horizontal axis relative to the surface of the backing plate articulate the one or more claws from the default position to the protracted position.

In some embodiments of the system, the support bias mechanism or the claw bias mechanism comprises at least one of a spring, a magnet, or a friction hinge.

In some embodiments of the system, the system further includes a wireless charging unit.

In some embodiments of the system, the restraint apparatus is configured as a module that replaces one or more components of an entertainment system.

In some embodiments of the system, the system further includes a tilt mechanism.

Another system is also disclosed. In one or more embodiments, the system includes a passenger seat. The system further includes a restraint apparatus for securing a mobile electronic device in to the passenger seat. The restraint apparatus includes a backing plate configured to attach to the passenger seat and provide support to a back surface of the mobile electronic device. The restraint apparatus further includes a support assembly coupled to the backing plate configured to support a bottom end of the mobile electronic device. The support assembly includes one or more support tabs configured to rotate along a horizontal axis relative to a surface of the backing plate and through a first aperture within the backing plate into an extended position, wherein the one or more support tabs configured in the extended position are configured to support the bottom end of the mobile electronic device. The support assembly further includes a support bias mechanism that biases one of the one or more support tabs into at least one of the extended position or a retracted position. The restraint assembly further includes a claw assembly coupled to the backing plate configured to support a top end of the mobile electronic device. The claw assembly includes one or more claws configured to articulate vertically through a second aperture within the backing plate from a default position to a protracted position, wherein the one or more claws configured in the protracted position supports the top end of the mobile electronic device. The claw assembly further includes a claw bias mechanism that biases one of the one or more claws towards the default position In some embodiments of the system, at least one of the one or more claws is configured to bias the mobile electronic device towards at least one of the backing plate or at least one of the one or more support tabs configured in the extended position.

In some embodiments of the system, at least one or the one or more support tabs is configured to bias the mobile electronic device towards at least one of the backing plate or at least one of the one or more claws configured in the default position.

In some embodiments of the system, the one or more claws are further configured to rotate along the horizontal axis relative to the surface of the backing plate, wherein a rotation of the one or more claws along the horizontal axis relative to the surface of the backing plate articulate the one or more claws from the default position to the protracted position.

In some embodiments of the system, the support bias mechanism or the claw bias mechanism comprises at least one of a spring, a magnet, or a friction hinge.

In some embodiments of the system, the system further includes a wireless charging unit.

In some embodiments of the system, the system further includes a tilt mechanism.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
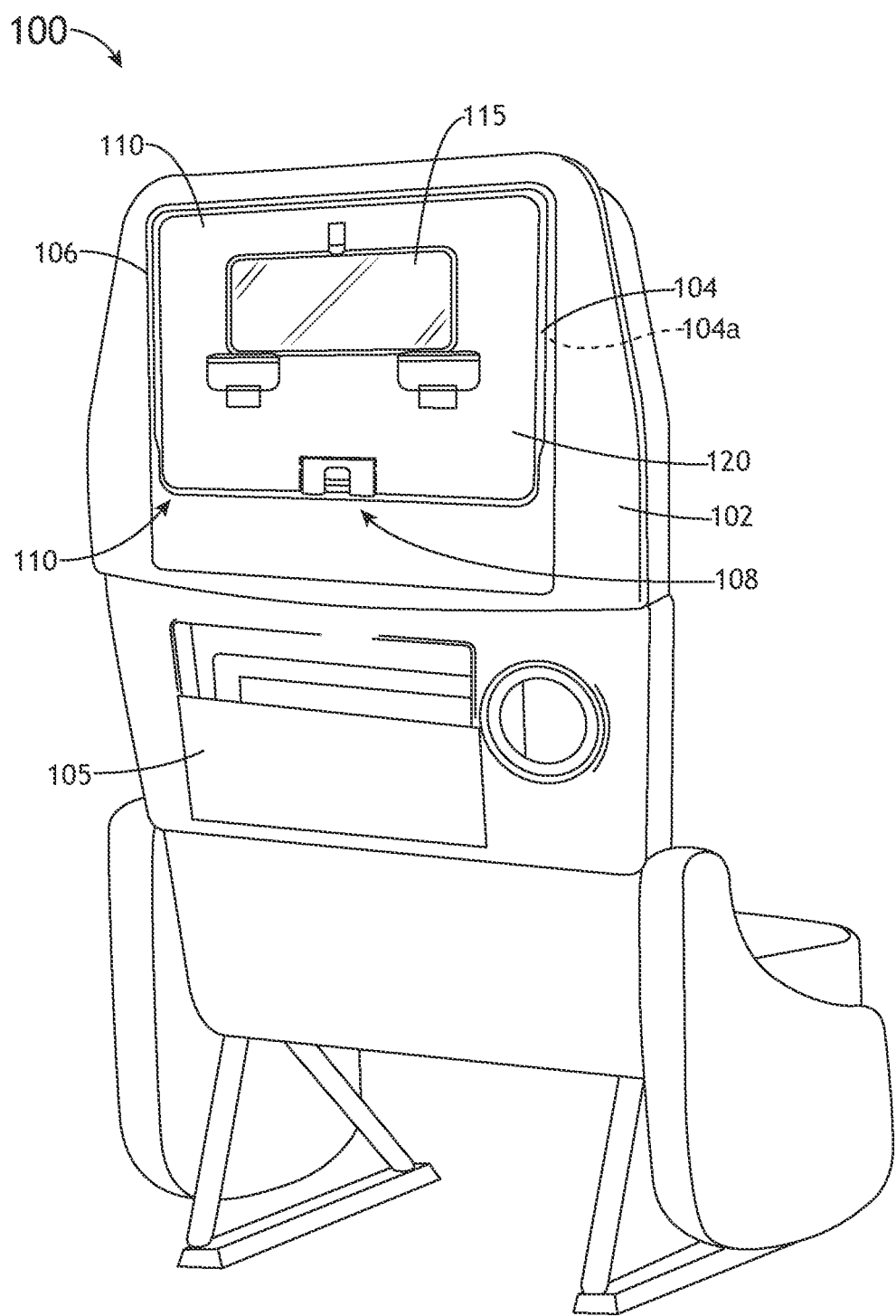
FIG. 1 illustrates a system for securing a mobile electronic device on a passenger seat, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Broadly, embodiments of the concepts disclosed herein are directed to a restraint apparatus for securing a mobile electronic device to a passenger seat. Mobile electronic devices (e.g., mobile phones, tablets), also referred to as personal electronic devices (PEDs), have been have become increasingly popular over time. As airlines and other transportation industries modernize, passenger seating is often redesigned to accommodate mobile electronic devices. These redesigns may also result in the removal or altering of in-flight entertainment (IFE) systems. The restraint apparatus described herein in this disclosure is designed to hold a PED in place for viewing by a traveler. Generally, the restraint apparatus is attached to the back-side of a passenger seat, allowing the passenger sitting behind the passenger seat to secure the PED to the restraint apparatus, allowing the passenger to watch and/or listen to the PED without having to hold the PED. The restraint apparatus may be configured as a module that replaces an IFE system. The resting apparatus may also be configured within a system that includes the resting apparatus and a passenger seat.

FIG. 1 illustrates a drawing of a system 100 comprising a passenger seat 105 and a restraint apparatus 110 coupled to the passenger seat, in accordance with one or more embodiments of the disclosure. The passenger seat may any type of seat and be installed in any type of vehicle including but not limited to an aircraft, a train, a bus, or a ship. For instance, the passenger seat 105 may be a seat installed in a commercial aircraft.

In some embodiments, the restraint apparatus 110 is configured as a module that replaces one or more components of an entertainment system. For example, the restraint apparatus 110 may replace an IFE system that comprises a display screen (e.g., a screen for watching in-flight movies). For instance, the restraint apparatus 110 may be configured to replace a monitor of an IFE, with the restraint apparatus 110 designed fit to a monitor bezel. By adjusting the restraint apparatus 110 to the monitor bezel that it is replacing, the restraint apparatus 110 gives a clean appearance to the seat without presenting an indication to the passenger that the restraint apparatus 110 is a replacement module. Alternatively, the restraint apparatus 110 may be initially incorporated into the passenger seat 105 (e.g., not used as a replacement part).

In embodiments, the restraint apparatus 110 is configured to secure a PED 115 to the passenger seat 105. For example, the restraint apparatus 110 may be configured to provide support to a back surface of the PED 115 (e.g., the surface opposite of the viewing screen). For instance, the back surface of the PED 115 may lie flat against a backing plate 120 of the restraint apparatus (i.e., the backing plate 120 is the relatively flat surface of the restraint apparatus 110 that faces away from the back of the passenger seat 105. In another instance, an edge of the PED 115 may lie flat against the backing plate 120 of the restraint apparatus (i.e. the top or bottom edge of the PED 115 is pressed against the backing plate 120).

Figure 2:
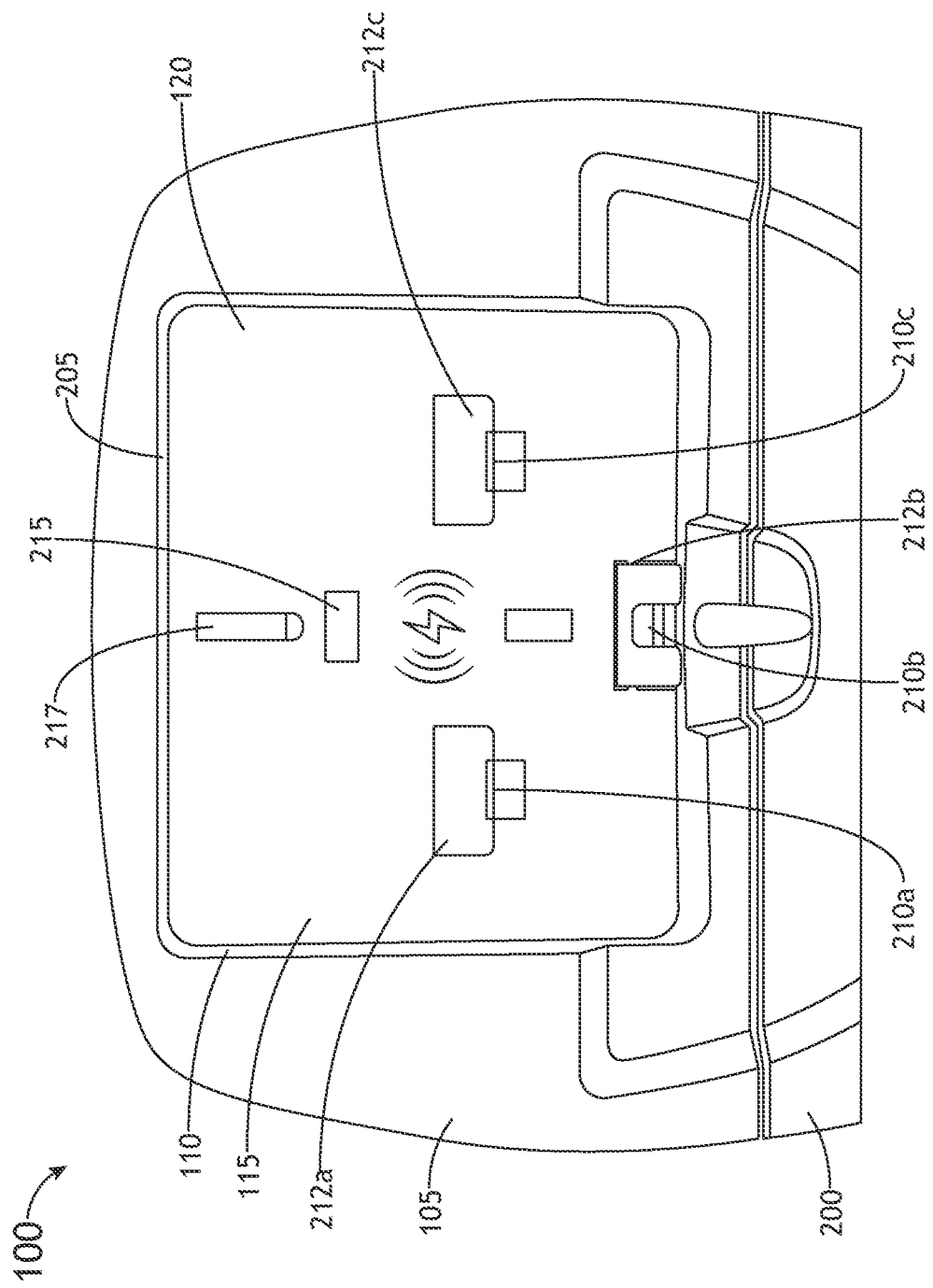
FIG. 2 illustrates a restraint apparatus for a mobile electronic device installed in a passenger seat, in accordance with one or more embodiments of the disclosure.

FIG. 2 is an illustration of the restraint apparatus 110 installed in a passenger seat 105 (e.g., above the folded tray table 200), in accordance with one or more embodiments of the disclosure. In some embodiments, the restraint apparatus 110 is installed entirely within the bezel boundary 200 of the IFE that the restraint apparatus 110 is replacing (e.g., as in FIG. 2). However, the restraint apparatus 110 may also be configured as larger or smaller is size that the bezel boundary 200. Therefore, the above description should not be interpreted as a limitation of the present disclosure, but as an illustration.

In embodiments, the restraint apparatus 110 includes one or more support tabs 210a, 210b, 210c configured to support the bottom end of the PED 115 (e.g., the one or more claws accessing the PED 115 through one or more claw access apertures 217 (e.g., a first aperture)). Any size, shape or number of support tabs 210a, 210b, 210c may be used. Any number and/or spacing of the one or more support tabs 210a, 210b, 210c may be used to support different PEDs 115 and different orientations of PEDs. For example, two support tabs 210a, 210c may be used to support a mobile phone placed in a landscape orientation. In another example, a single support tab 210b may be used to support a mobile phone placed in the portrait orientation.

In embodiments, the restraint apparatus 110 includes one or more claws 215 configured to support the top end of the PED 115 (e.g., the one or more claws accessing the PED 115 through one or more claw access apertures 217 (e.g., a second aperture)). The one or more claw Any size, shape, or number of claws 215 may be used. For example, a single claw may be configured to secure a mobile phone, whether the mobile is placed in a landscape or portrait orientation.

Figure 3:
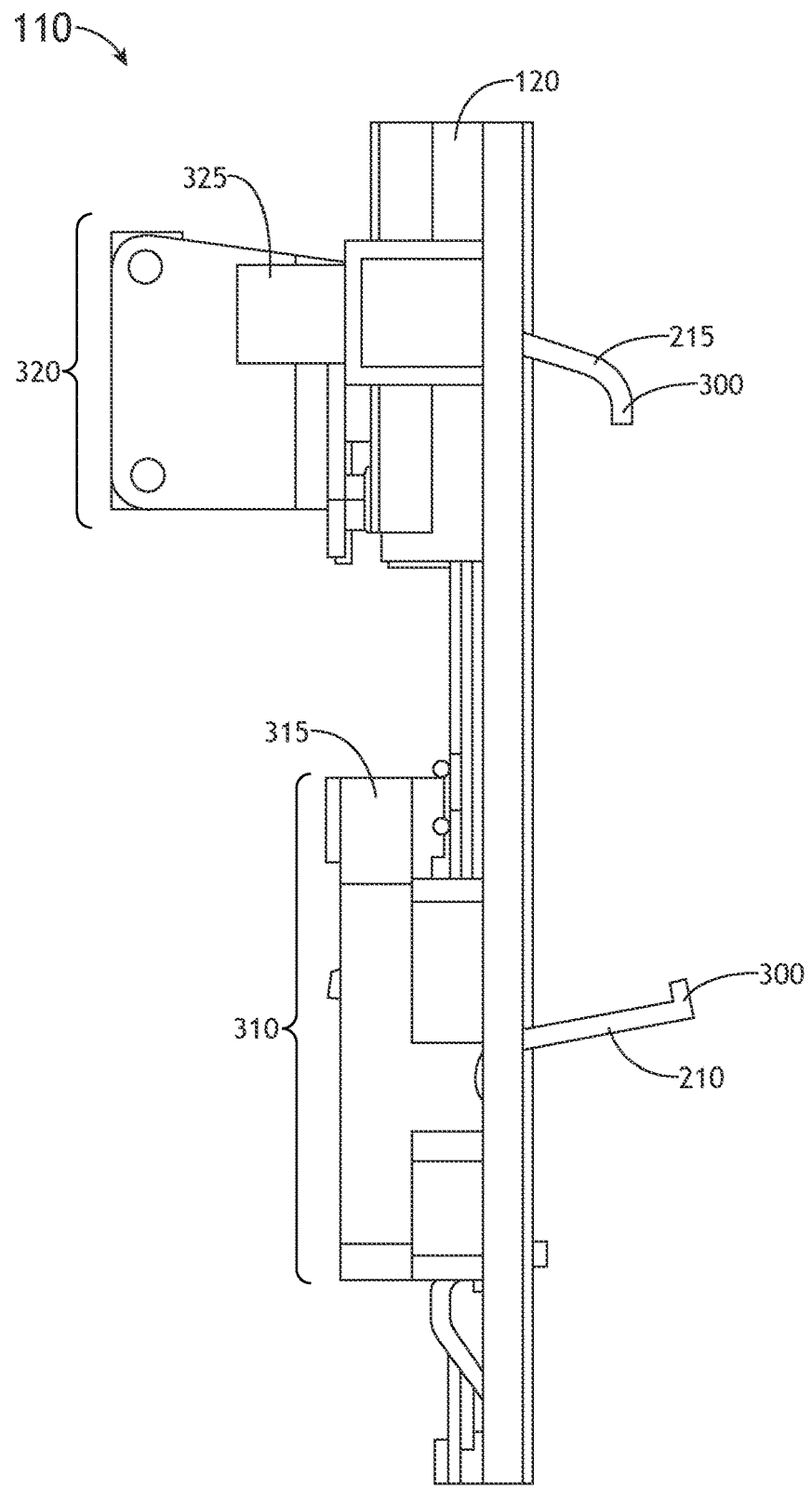
FIG. 3 illustrates a side view of a restraint device for a mobile electronic device, in accordance with one or more embodiments of the disclosure.

FIG. 3 illustrates a side view of the restraint apparatus 110, in accordance with one or more embodiments of the disclosure. One claw 215 is shown in a default position (e.g., a position that allows for an initial engagement with the top end of the PED 115). One support tab 210 is shown in an extended position (e.g., a position that allows for engagement with the bottom end of the PED 115. Together, the independent movements of the one or more claw 215 and the one or more support tabs 210 allow the restraint apparatus 100 to secure different sizes of PEDs.

In embodiments, the one or more claws 215 are hinged (e.g., the hinge having a horizontal axis), with rotation along the hinge facilitating the necessary movement for the one or more claws to rotate back and forth from the default position to a protracted position (e.g., the protracted position being any position other than the default position).

In embodiments, the one or more support tabs 210 are hinged (e.g., the hinge having a horizontal axis), with the rotation along the hinge facilitating the necessary movement for the one or more support tabs 210 to rotate back and forth from the extended position to a retracted position (e.g., a position wherein the support tab is flush, or substantially flush, with the backing plate 120 or recessed within the backing plate 120). Together, the rotation of the one or more support tabs 210 and the one or more claws 215 work independently to provide a pincher grip upon a PED 115.

In embodiments, the one or more support tabs 210 further comprises a retaining end 300 configured to prevent the lower end of the PED 115 from sliding off of the one or more support tabs 210. Similarly, the one or more claws 215 further comprises a hook 305 configured to prevent the top end of the PED 115 from sliding off of the one or more claws 215. Together, the rotation of the one or more support tabs 210 and the one or more claws 215 work independently to provide a pincher grip upon a PED 115, with the one or more retaining ends 300 and the one or more hooks 305 preventing the PED 115 from falling out of the pincher grip.

In embodiments, the restraint apparatus 110 further comprises a support assembly 310 coupled to the backing plate 120 configured to facilitate the movement of at least one of the one or more support tabs 210. The support assembly 310 includes the one or more support tabs 210 and provides a framework for the one or more support tabs 210 to rotate (e.g., the framework providing or acting as a portion of a hinge component that allows rotation of the one or more support tabs 210 along the horizontal axis). The support assembly 310 also includes a support bias mechanism 315 coupled to the one or more support tabs 210.

The support bias mechanism 315 provides a motive force upon, or biases, the one or more support tabs towards the extended position and/or the retracted position. For example, the support bias mechanism 315 may bias the one or more support tabs 210 from the extended position to the retracted position. For instance, when the PED 115 is placed upon the one or more support tabs 210 in the extended position (e.g., the one or more support tabs is manually pulled out and/or downward from the retracted position, the support bias mechanism 315 may bias the one or more support tabs 210 toward the one or more claws 215 and/or the backing plate. The force upon of the one or more support tabs 210 may persist after the PED 115 has been installed in the restraint apparatus, further securing the PED 115. In another instance, when the PED 115 is removed from the one or more support tabs, the support bias mechanism 315 may bias the one or more support tabs 210 to the retracted position, resulting in the one or more support tabs 210 becoming flush, or substantially flush, with the backing plate 120 or recessed within the backing plate 120.

In embodiments, the restraint apparatus 110 further comprises a claw assembly 320 coupled to the backing plate 120 configured to facilitate the movement of at least one or the one or more claws. The claw assembly 320 includes the one or more claws 215 and provides a framework the one or more claws 215 to articulate vertically through an aperture (e.g., a second aperture) in the backing plate 120. For example, the claw assembly 320 may be configured to attach to the claw via a hinge. The hinge may then be configured to allow rotation of the one or more claws along a horizontal axis relative to a surface of the backing plate 120. In another example, the claw assembly 320 may be configured to translate the one or more claws 215 vertically relative to the surface of the backing plate 120.

The claw bias mechanism 325 provides a motive force upon, or biases, the one or more claws 215 towards the default position and/or the protracted position. For example, the claw bias mechanism 325 may bias the one or more claws 215 from the default position to the protracted position. For instance, when the PED 115 is pushed against the one or more claws 215 in an effort to secure the PED 115 in the restraint apparatus 110, the claw bias mechanism 325 will apply a bias to the one or more claws 215 to resist movement of the one or more claws 215 from the default position to the protracted position. The force upon the one or more claws 215 may persist after the PED 115 has been installed in the restraint apparatus 110, further securing the PED 115. In another instance, upon removal of the PED 115 from the restraint apparatus 110, the claw bias mechanism 325 may bias the one or more claws 215 back to the default position.

Both the support bias mechanism 315 and the claw bias mechanism 325 may each utilize one or one or more types of biasing mechanisms. These biasing mechanisms may include but are not limited to including springs (e.g., linear springs, torsion springs, compression springs, or extension springs), magnets, or friction hinges. For example, the claw bias mechanism 325 may include a linear spring that biases the one or more claws 215 toward the default position. In another example, the support bias mechanism 312 may include a friction hinge, also referred to as a torque hinge, to bias the one or more support tabs 210 toward the retracted position. The biasing mechanisms for the support bias mechanism 315 and/or the claw bias mechanism 325 may be tuned so as to adjust the forces required to move the support tabs 210 and/or claw 215 into the stowed position (e.g., default position and/or extended position) and/or the deployed position (e.g., extended position and/or protracted position). Additionally, damper devices may be installed on the biasing mechanisms.

Figure 4:
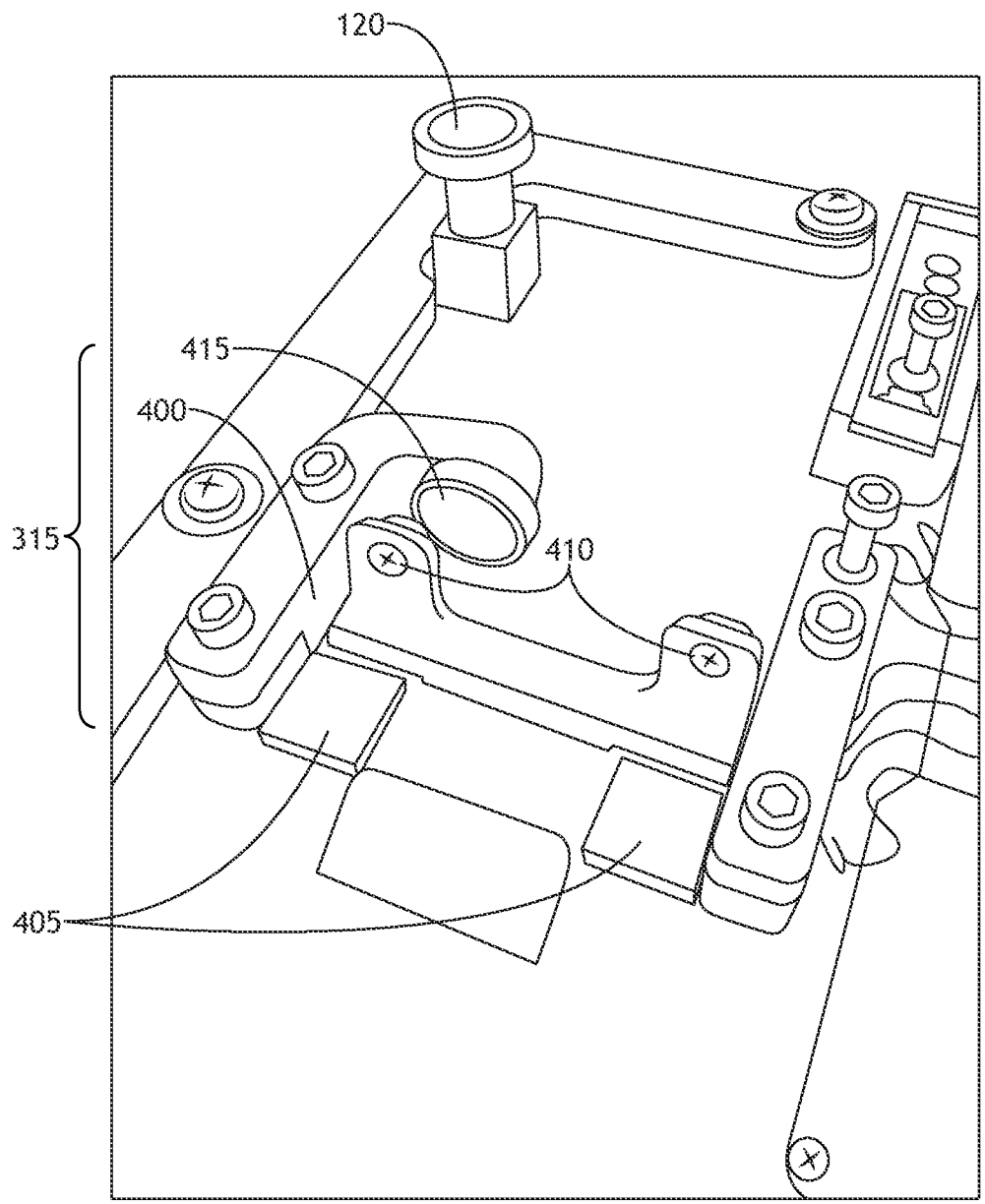
FIG. 4 illustrates a biasing mechanism coupled to the back side of a backing plate, in accordance with one or more embodiments of the disclosure.

FIG. 4 illustrates the support bias mechanism 315 coupled to the back side of the backing plate 120 configured to use magnets, in accordance with one or more embodiments of the disclosure. The magnets may be used to bias the one or more support tabs 210 to the extended position and/or hold the one or support tabs 210 in the retracted position.

In some embodiments, the support bias mechanism 315 includes a hinge tab 400 coupled to the one or more support tabs 210 (i.e., the hinge tab 400 and the one of more support tabs 210 share the same hinge) and held into place on the back side of the backing plate 120 via clamps. The rotation of the hinge tab 400 on the back side of the backing plate 120 results in equal and opposite movement of the front side of the backing plate 120. In some embodiments, the support bias mechanism 315 further includes one or more deploy magnets 405 oriented to attract ferrous material 410 that has been incorporated into the hinge tab 400. The attracting force of the deploy magnets 405 to the hinge tab 400 biases the one or more support tabs 210 toward the extended position. For example, when installing the PED 115 into the restraint apparatus 110, the deploy magnets 405, push the one or more support tabs 210, via the attractive action of the hinge tab 400 with the deploy magnets 405, towards the extended position.

In some embodiments, the support bias mechanism 315 includes a retraction magnet 415 oriented to attract to the ferrous material 410 incorporated into the hinge tab 400 to the retracted position. For example, when the PED 115 has been removed from the restraint apparatus 120 and the one or more support tabs has traveled close to the retracted position, the retraction magnet 415 attracts the hinge tab 400 and magnetically locks the one or more support tabs 210 into the retracted position. The movement of the support tab from a non-retracted position to the retracted position may require a small force applied by a user. The retraction magnet 415 prevents unintended employment of the one or more support tabs 210.

Figure 5:
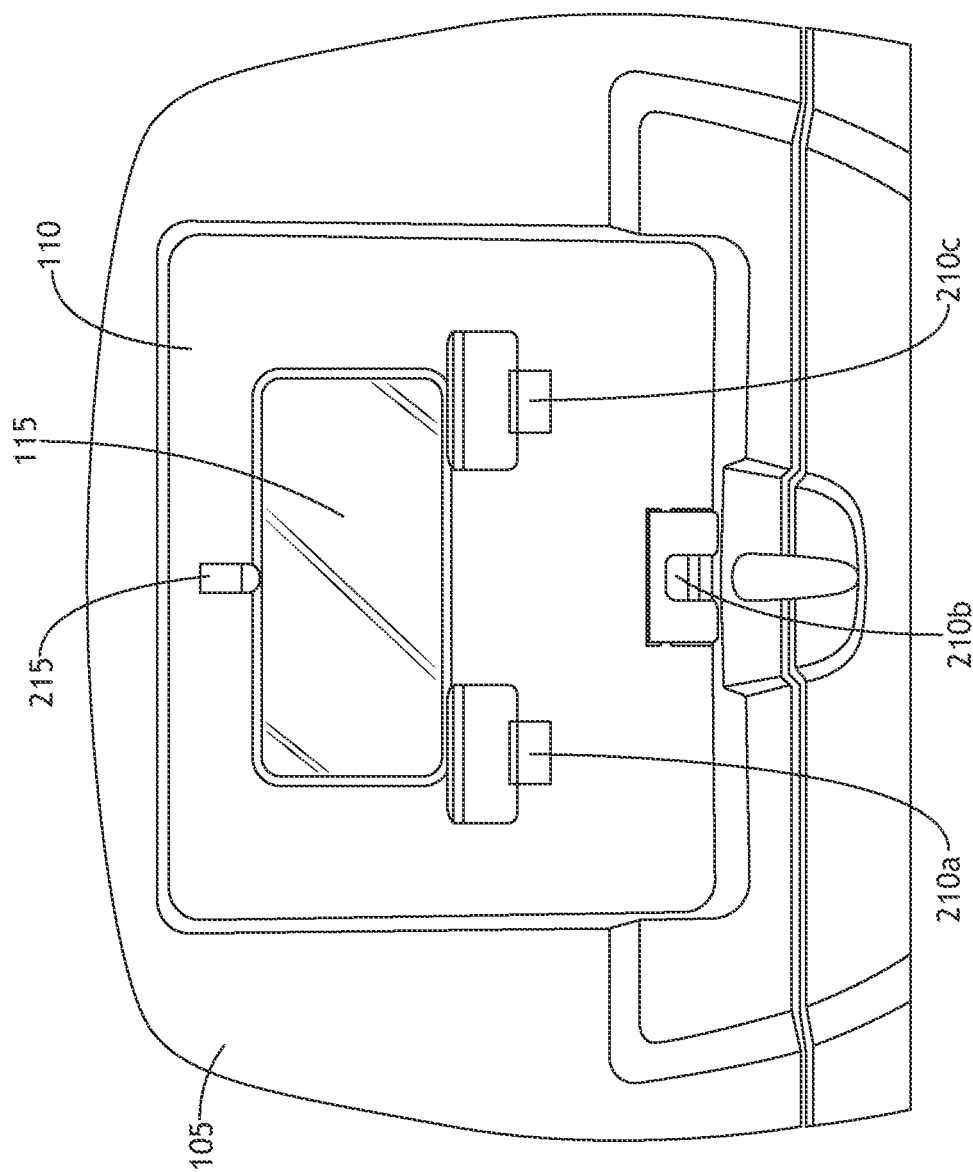
FIG. 5 illustrates a mobile electronic device secured within the restrain apparatus in a landscape orientation in accordance with one or more embodiments of the disclosure.

FIG. 5 illustrates the PED 115 secured to the restraint apparatus 110 in the landscape position (e.g., the screen is oriented so that the width of the viewing screen is longer than the height of the viewing screen). The claw 215 is applying a downward force on the PED 115 towards the support tabs (210a, 210c) as well as force against on the PED 115 against the backing plate 120. The support tabs 210a, 210b are applying an upward force on the PED 115 towards the claw 215 as well as a force on the PED 115 against the backing plate 120. One support tab 210b is not used in this case. Together, the independent actions of the claw 215 and the support tabs 210 secure the PED 115 against the backing plate 120 without obscuring the screen of the PED 115.

Figure 6:
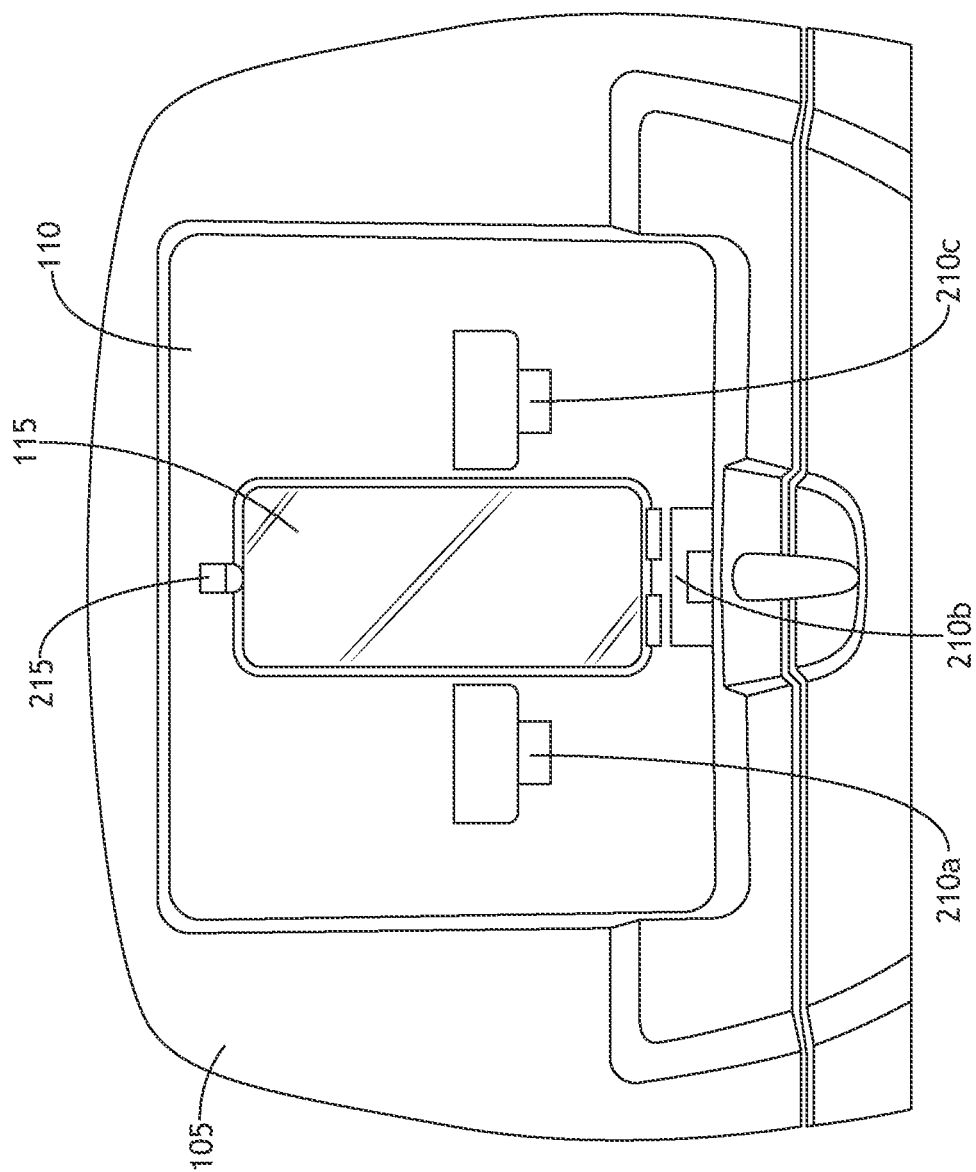
FIG. 6 illustrates a mobile electronic device secured within the restrain apparatus in a portrait orientation in accordance with one or more embodiments of the disclosure.

FIG. 6 illustrates the PED 115 secured to the restraint apparatus 110 in the portrait position (e.g., the screen is oriented so that the width of the viewing screen is shorted than the height of the viewing screen). As in FIG. 5, the claw 215 is applying a downward force on the PED 115 toward the support tab 210b as well as a force on the PED 115 against the backing plate 120. One support tab 210b is applying an upward force on the PED 115 towards the claw 215 as well as a force on the PED 115 against the backing plate. Two support tabs 210a, 210c are not used in this case.

In some embodiments, the restraint apparatus 110 further includes a tilt mechanism. The tilt mechanism is configured to change the viewing angle of the PED 115 as installed on the restraint apparatus 110 so as to be more comfortable or easily watched by a user. The tilt mechanism may be configured to tilt the restraint apparatus 120 in one or more axes of rotation. For example, the tilt mechanism may be configured to tilt the restraint apparatus 120 in an upward and downward direction. For instance, the tilt mechanism may be configured for a tall passenger to adjust the restraint apparatus 120 to tilt upward so that the passenger can see the screen of the PED 115 comfortably. In another example, the tilt mechanism may be configured to tilt the apparatus in an upward and downward direction and a left-to-right direction. For instance, the tilt mechanism may be configured for a passenger to adjust the restraint apparatus 120 to tilt to the left so that a person seated to the left of the passenger can see the screen of the PED 115, along with the passenger. In another example, the tilt mechanism may be configured to tilt in any direction. The tilting mechanism may use any type of technology known in the art that could be used for such a mechanism.

Figure 7:
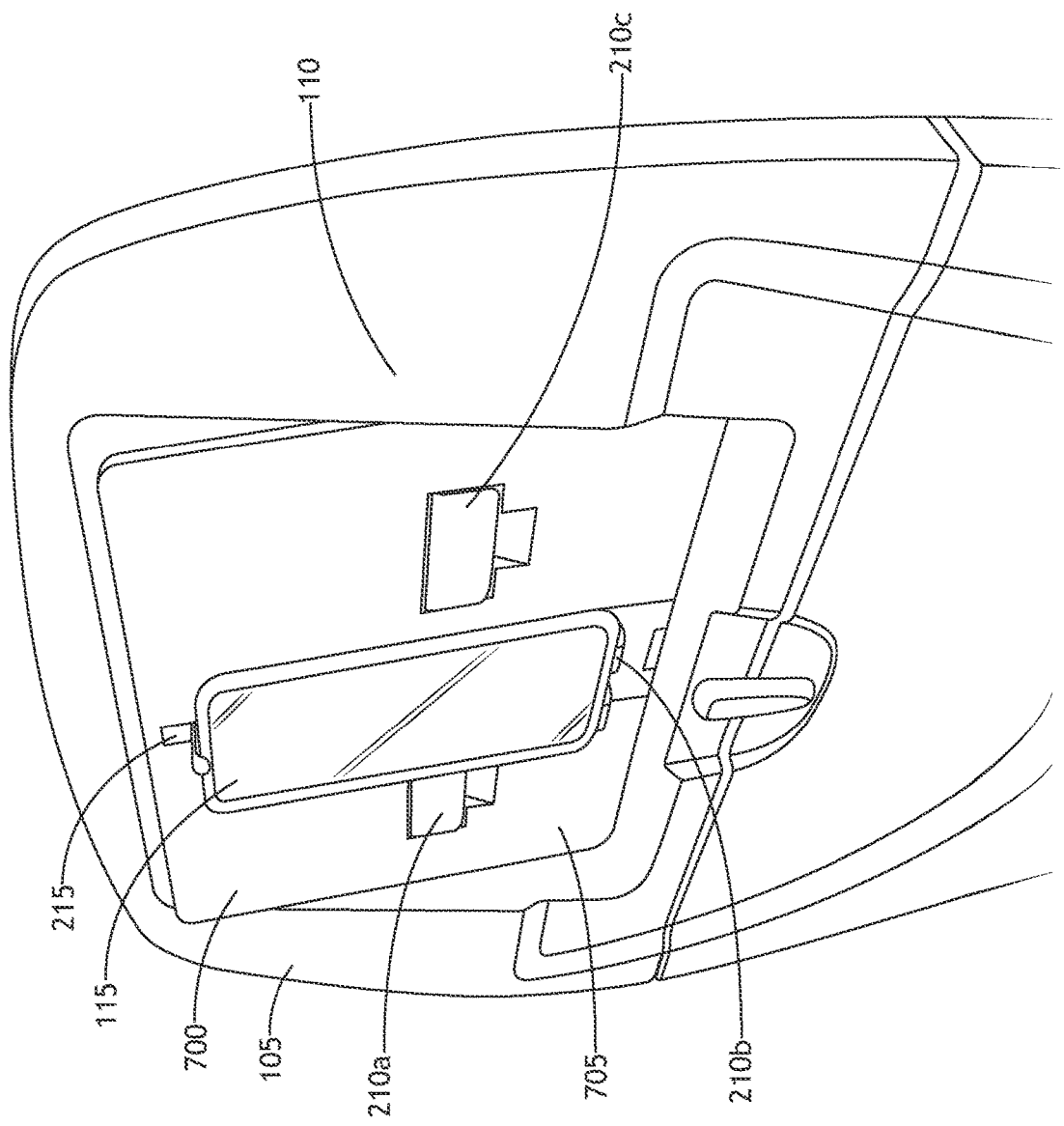
FIG. 7 illustrates a mobile electronic device secured within a tilt-capable restrain apparatus configured in a no-tilt position, in accordance with one or more embodiments of the disclosure.
Figure 8:
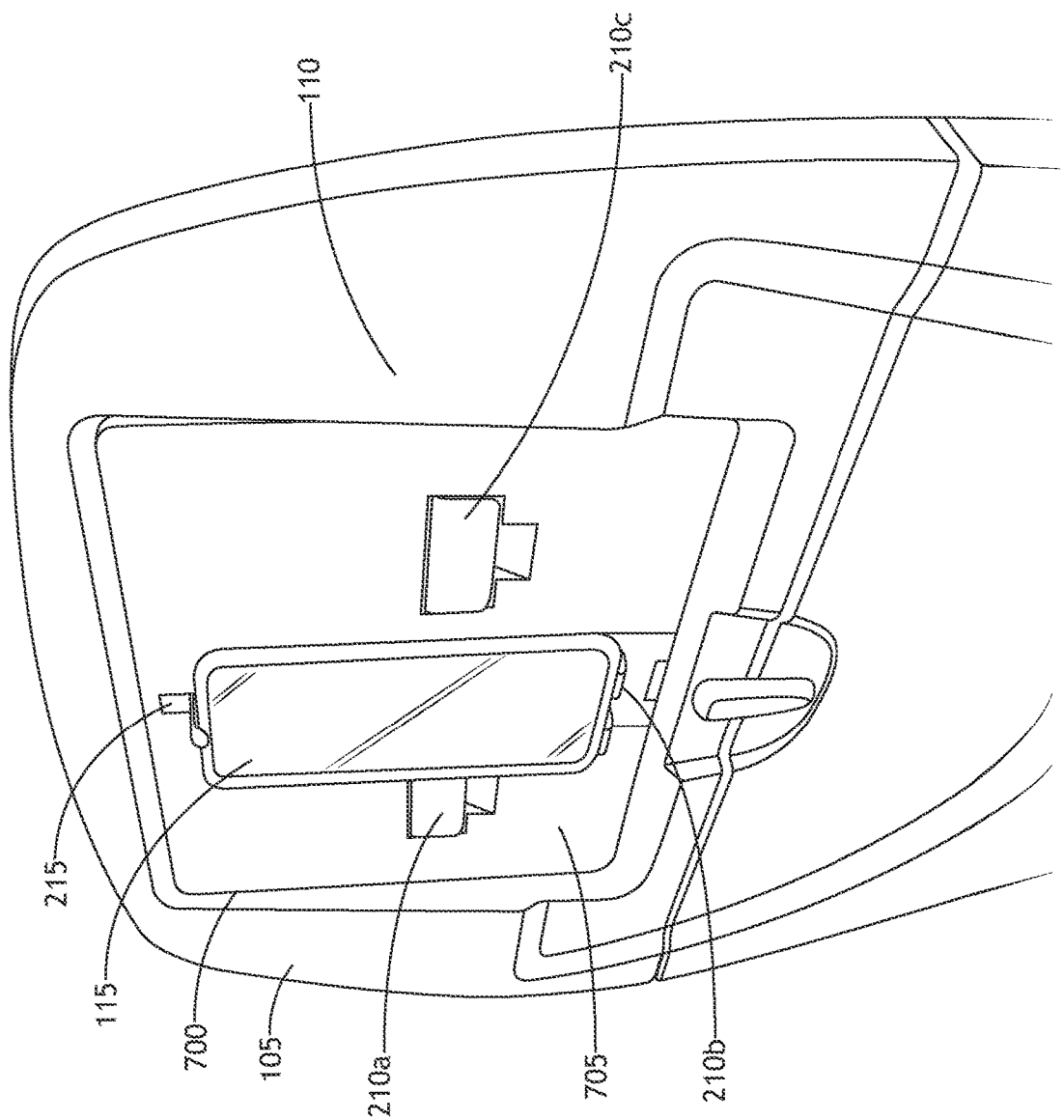
FIG. 8 illustrates a mobile electronic device secured within a tilt-capable restrain apparatus configured in a tilt-down position, in accordance with one or more embodiments of the disclosure.
Figure 9:
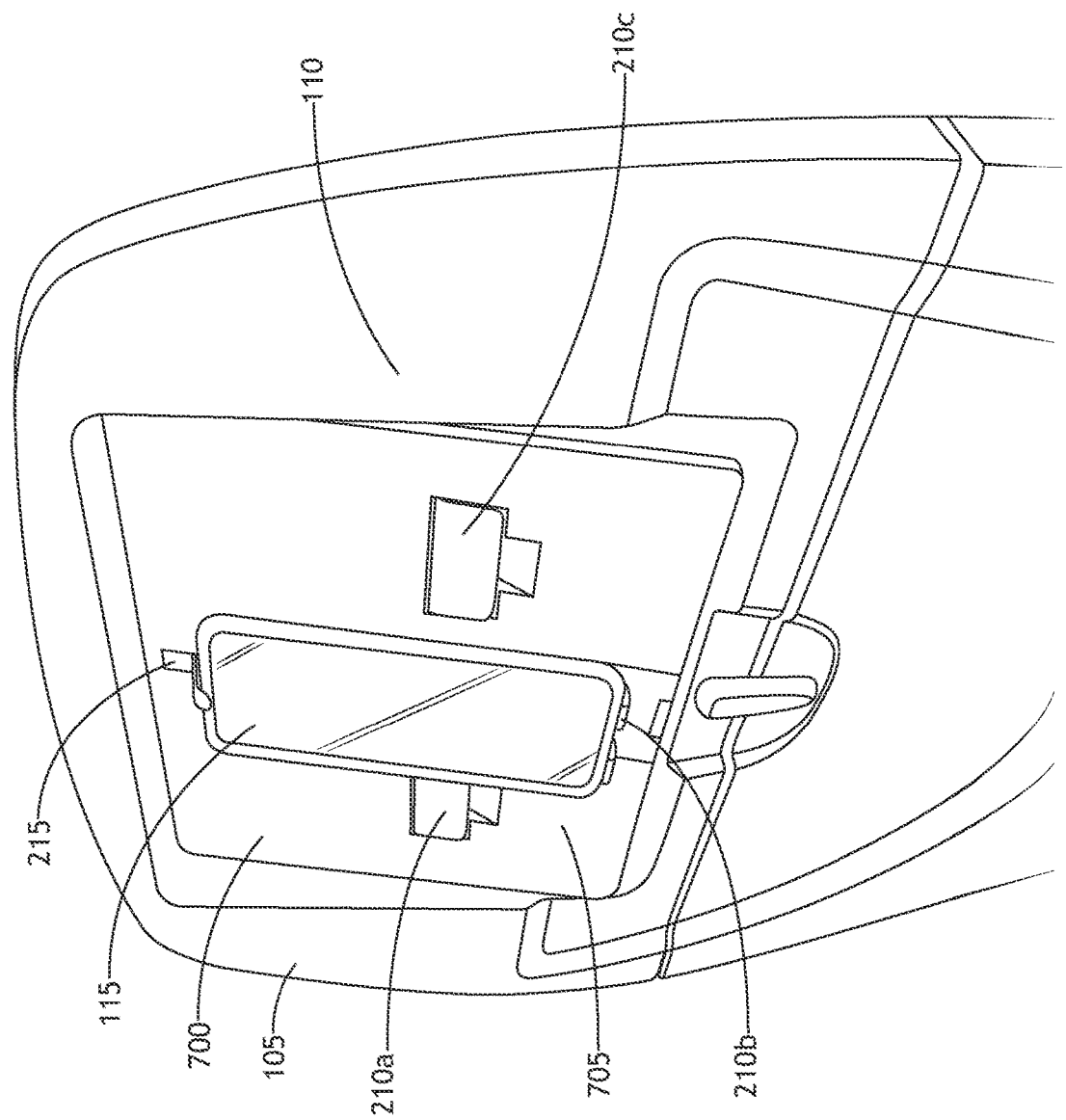
FIG. 9 illustrates a mobile electronic device secured within a tilt-capable restrain apparatus configured in a tilt-up position, in accordance with one or more embodiments of the disclosure.

FIGS. 7-9 illustrate a restraint apparatus 120 configured with tilt mechanism installed on a passenger seat 105, in one or more embodiments of the disclosure. For example, FIG. 7 illustrates the restraint apparatus 120 with the tilt mechanism in a neutral position (e.g., no tilt relative to the back of the passenger seat 105). In this configuration a top portion 700 of the restraint apparatus 120 and a bottom portion 700 of the restraint apparatus 120 are recessed to the same depth within the bezel boundary 200. In FIG. 8, the restraint apparatus is tilted downward, the top portion 700 of the restraint apparatus nearly flush with the back of the passenger seat 105 while the bottom portion 705 is further recessed within the bezel boundary 200. In FIG. 8, the restraint apparatus 120 is tilted upward, the top portion being recessed into the bezel boundary 200, while the bottom portion 700 is nearly flush with the back of the passenger seat 105.

Figure 10:
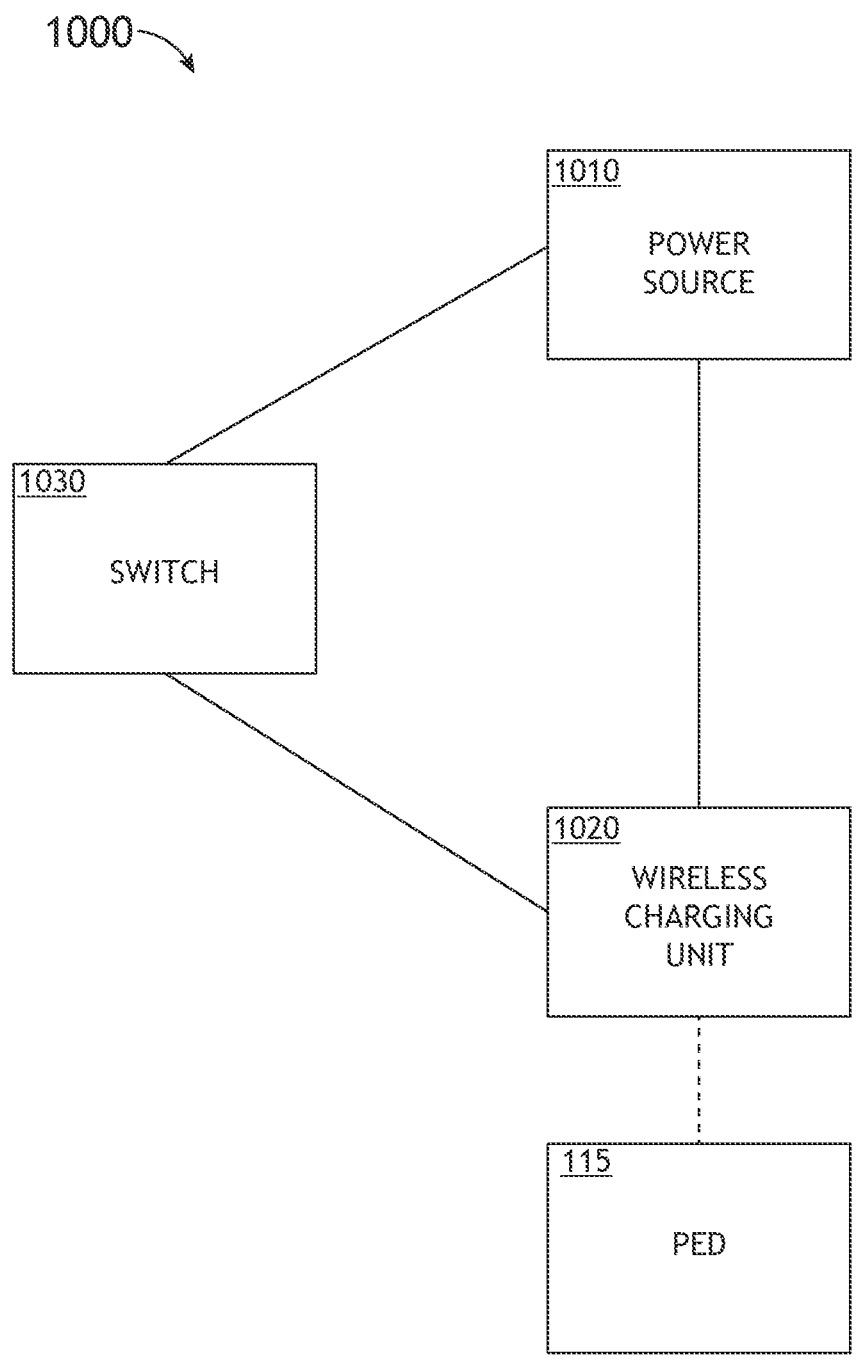
FIG. 10 illustrates a block diagram of a wireless charging scheme configured for use within the system, in accordance with one or more embodiments of the disclosure.

FIG. 10 illustrates a block diagram of a wireless charging scheme 1000 configured for use within the system 100, in accordance with one or more embodiments of the disclosure. The wireless charging scheme includes a wireless charging unit 1020 configured to charge the PED 115 while the PED 115 is secured on the restraint apparatus 110. The wireless charging scheme 1000 may include a power source 1010. The power source 1010 may comprise the previous IFE power source and IFE wiring for power and/or control (e.g., a low voltage power system). Alternatively, the power source 1010 may comprise wiring custom made for the wireless charging scheme 1000. The wireless charging scheme 1000 may include a switch 1030 to turn on and/or off charging activity. The switch 1030 may be a physical or virtual (e.g., icon on a display screen) switch that is toggled by a user. The switch 1030 may also be an automated switch that turns on when the PED 115 is secured to the restraint apparatus 120 and turned off when the PED 115 is removed from the restraint apparatus. The wireless charging unit 1020 may comprise any charging unit or technology configured to charge any PED 115. For example, the wireless charging unit 1020 may comprise an electromagnetic resonant wireless charger. In another example, the wireless charging unit 1020 may comprise a radio frequency wireless charger. In another example, the wireless charging unit may comprise a Qi inductive wireless charger.

Figure 11:
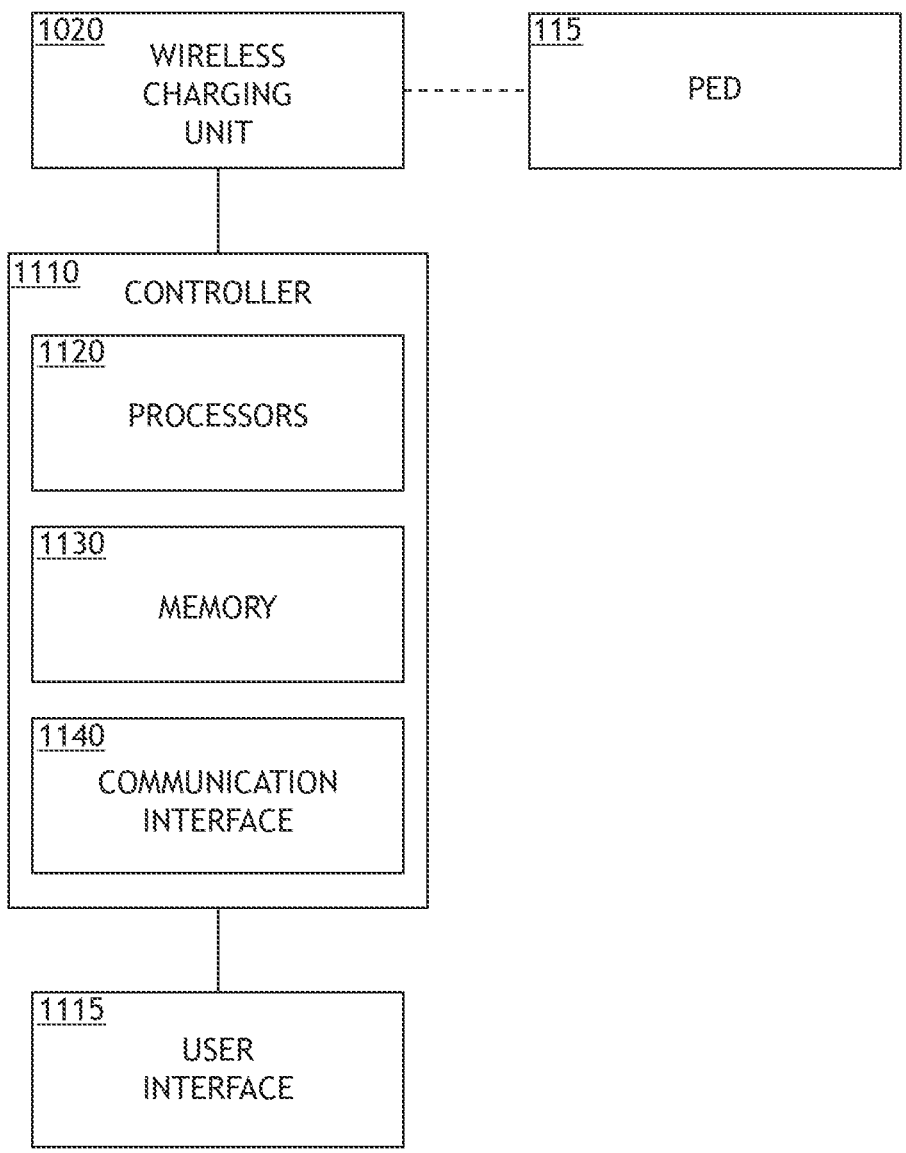
FIG. 11 illustrates a block diagram of a wireless charging control arrangement configured for use within the system, in accordance with one or more embodiments of the disclosure.

FIG. 11 illustrates a block diagram of a wireless charging control arrangement 1100 configured for use within the system 100, in accordance with one or more embodiments of the disclosure. The wireless charging control arrangement 1100 is configured to control wireless charging processes of the wireless charging unit 1020. The wireless charging control arrangement 1110 includes the wireless charging unit 1020, a controller 1110, and a user interface 1115. The controller 1110 being in communication with the wireless charging unit 1020. The controller 1110 is configured to receive, process, and transmit data and/or power within the wireless charging control arrangement 1100. The controller 1110 includes one or more processors 1120 configured to perform functions or steps according to program instructions stored in a memory 1130, The controller 1110 is further configured to include a communication interface 1140. The communication interface 1140 is configured to facilitate data transfer between components of the wireless charging control arrangement 1100 and/or the controller 1110.

The one or more processors 1120 may include any type of circuitry and/or type of processing elements, including but not limited to integrated circuits (e.g., application specific integrated circuits (ASIC) and field programmable gate arrays (FPGA). The memory 1130 may also include resident or external memory for storing data, executable code, and other resident or external memory generated by the wireless charging control arrangement 1100. The controller 1110 can execute one or more software programs embodied in a non-transitory computer readable medium (e.g., memory 1130). The controller 110 is not limited by the materials from which it is formed or the processing mechanisms employed therein and, as such, can be implemented via semiconductor (s) and/or transistors, and so forth.

The memory 1130 can be an example of tangible, computer-readable storage medium that provides storage functionality to store various data and/or program code associated with operation of the wireless charging control arrangement 1100, the wireless charging unit 1020 and/or controller 1110, such as software programs and/or code segments, or other data to instruct the controller 1110, and possibly other components of the wireless charging control arrangement 1100, to perform the functionality described herein. Thus, the memory 1130 can store data, such as a program of instructions for operating the controller 910 and other components of the wireless charging control arrangement 1100. It should be noted that while a single memory 1130 is described, a wide variety of types of combinations of memory 1130 (e.g., tangible, non-transitory memory) may be employed. The memory 1130 can be integral with the controller 1110, can comprise stand-alone memory, or can be a combination of both. Some examples of the memory 1130 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 1140 can be operatively configured to communicate with componentry within the controller 1110, the wireless charging unit 1020 and/or the wireless charging control arrangement 1100. For example, the communication interface 1140 may be configured to retrieve data from the controller 110, transmit data for storage in the memory 1130, retrieve data from storage in the memory 1130, and so forth. The communication interface 1140 can also be communicatively coupled with the controller 1110 to facilitate data transfer between components of the controller 1110, the wireless charging unit 1020 and/or the wireless charging control arrangement 1100.

It should be noted that while the communication interface 1140 is described as a component of the controller 1110 and/or the wireless charging control arrangement 1100, one or more components of the communication interface 1140 may be implemented as external components communicatively coupled to the wireless charging unit via a wireline and/or wireless connection.

In embodiments, the wireless charging control arrangement 1100 includes a user interface 1115. The user interface 1115 allows the wireless charging control arrangement 1100 to communicate with a user. The user interface may include any type of tool or input device that allows a user to interact with the wireless charging control arrangement 1100. For example, the user interface 1115 may include an input device including but not limited to buttons, switches, toggles, a keyboard, or a touchscreen display. In embodiments, the user interface 1115 is communicatively coupled to the controller 1110. The communication chain from the user interface 1115 to controller 1110 to wireless charging unit 1020 may be facilitated by a wired connection, a wireless connection, or a mixture of wired and wireless connections.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system comprising:
a restraint apparatus for securing a mobile electronic device to a passenger seat in a vehicle comprising:
a backing plate configured to attach to the passenger seat and provide support to a back surface of the mobile electronic device;
a support assembly coupled to the backing plate configured to support a bottom end of the mobile electronic device comprising:
one or more support tabs configured to rotate along a horizontal axis relative to a surface of the backing plate and through a first aperture within the backing plate into an extended position, wherein the one or more support tabs configured in the extended position are configured to support the bottom end of the mobile electronic device; and
a support bias mechanism that biases one of the one or more support tabs into at least one of the extended position or a retracted position; and
a claw assembly coupled to the backing plate configured to support a top end of the mobile electronic device comprising:
one or more claws configured to articulate vertically through a second aperture within the backing plate from a default position to a protracted position, wherein the one or more claws configured in the protracted position supports the top end of the mobile electronic device; and
a claw bias mechanism that biases the one or more claws towards the default position;
wherein:
the one or more support tabs includes a first support tab positioned between a second support tab and a third support tab;
the second and third support tabs are horizontally aligned;
the first support tab is positioned lower on the backing plate as compared to the second and third support tabs;
the one or more claws includes a claw positioned vertically aligned with the first support tab; and
the claw is positioned higher on the backing plate as compared to the second and third support tabs.
2. The system of claim 1, wherein at least one of the one or more claws is configured to bias the mobile electronic device towards at least one of the backing plate or at least one of the one or more support tabs configured in the extended position.
3. The system of claim 1, wherein the one or more claws are configured to rotate along a horizontal axis relative to the surface of the backing plate, wherein a rotation of the one or more claws along the horizontal axis relative to the surface of the backing plate articulates the one or more claws from the default position to the protracted position.
4. The system of claim 1, wherein the support bias mechanism or the claw bias mechanism comprises at least one of a spring, a magnet, or a friction hinge.
5. The system of claim 1, further comprising a wireless charging unit.
6. The system of claim 1, further comprising a tilt mechanism.
7. A system comprising:
a passenger seat; and
a restraint apparatus for securing a mobile electronic device in to the passenger seat comprising:
a backing plate configured to attach to the passenger seat and provide support to a back surface of the mobile electronic device;
a support assembly coupled to the backing plate configured to support a bottom end of the mobile electronic device comprising:
one or more support tabs configured to rotate along a horizontal axis relative to a surface of the backing plate and through a first aperture within the backing plate into an extended position, wherein the one or more support tabs configured in the extended position are configured to support the bottom end of the mobile electronic device; and
a support bias mechanism that biases one of the one or more support tabs into at least one of the extended position or a retracted position; and
a claw assembly coupled to the backing plate configured to support a top end of the mobile electronic device comprising:
one or more claws configured to articulate vertically through a second aperture within the backing plate from a default position to a protracted position, wherein the one or more claws configured in the protracted position supports the top end of the mobile electronic device; and
a claw bias mechanism that biases one of the one or more claws towards the default position;
wherein:
the one or more support tabs includes a first support tab positioned between a second support tab and a third support tab;
the second and third support tabs are horizontally aligned;
the first support tab is positioned lower on the backing plate as compared to the second and third support tabs;
the one or more claws includes a claw positioned vertically aligned with the first support tab; and
the claw is positioned higher on the backing plate as compared to the second and third support tabs.
8. The system of claim 7, wherein the one or more claws are further configured to rotate along a horizontal axis relative to the surface of the backing plate, wherein a rotation of the one or more claws along the horizontal axis relative to the surface of the backing plate articulates the one or more claws from the default position to the protracted positions.

9. The system of claim 7, wherein the support bias mechanism or the claw bias mechanism comprises at least one of a spring, a magnet, or a friction hinge.

10. The system of claim 7, further comprising a wireless charging unit.

11. The system of claim 7, further comprising a tilt mechanism.

* * * * *